United States Patent [19]

Lucid et al.

[11] 4,212,849

[45] Jul. 15, 1980

[54] SIMULTANEOUS EXTRACTION AND RECOVERY OF URANIUM AND VANADIUM FROM WET PROCESS ACIDS

[75] Inventors: Michael F. Lucid; Wilbert J. Robertson, both of Oklahoma City; Paul D. Bowerman, Edmond, all of Okla.

[73] Assignee: Kerr-McGee Corporation, Oklahoma City, Okla.

[21] Appl. No.: 869,087

[22] Filed: Jan. 13, 1978

Related U.S. Application Data

[63] Continuation-in-part of Ser. No. 720,995, Sep. 7, 1976, abandoned.

[51] Int. Cl.$^2$ ..................... B01D 11/00; C01G 56/00
[52] U.S. Cl. ....................................... 423/10; 423/63; 252/301.1 R
[58] Field of Search ........................... 423/10, 63, 321; 252/301.1 R

[56] References Cited

U.S. PATENT DOCUMENTS

| | | | |
|---|---|---|---|
| 2,859,094 | 11/1958 | Schmitt et al. | 423/10 X |
| 3,243,257 | 3/1966 | Coleman | 423/10 X |
| 3,378,352 | 4/1968 | Hansen | 423/10 X |
| 3,836,476 | 9/1974 | Baldwin et al. | 252/301.1 R |

Primary Examiner—Benjamin R. Padgett
Assistant Examiner—J. L. Barr
Attorney, Agent, or Firm—William G. Addison

[57] ABSTRACT

A process for the simultaneous coextraction of uranium and vanadium from an aqueous acidic solution containing the same comprising contacting said aqueous acidic solution with an organic phase comprising a mixture of (a) an alkyl substituted diaryl phosphoric acid, (b) a trialkylphosphine oxide compound, and (c) an organic diluent whereby the uranium and vanadium are coextracted into the organic phase and thereafter recovering the uranium and vanadium from the organic phase.

30 Claims, No Drawings

4,212,849

SIMULTANEOUS EXTRACTION AND RECOVERY OF URANIUM AND VANADIUM FROM WET PROCESS ACIDS

CROSS-REFERENCE TO RELATED APPLICATIONS

This application is a continuation-in-part of applicants' copending application Ser. No. 720,995 filed Sept. 7, 1976 now abandoned entitled "Simultaneous Extraction and Recovery of Uranium and Vanadium from Wet Process Acids."

BACKGROUND OF THE INVENTION

Phosphoric acid generally is produced commercially by one of two methods. One method generally is called the "furnace" method, and the other generally is referred to as the "wet process" method. In the wet process method of producing phosphoric acid, phosphate rock is contacted with a mineral acid such as sulfuric acid. Most phosphate rock contains metal compounds in varying amounts. In many cases, these metal compounds are dissolved from the phosphate rock and appear in the wet process acid as contaminants. Vanadium and uranium compounds are among those dissolved from the phosphate rock, particularly when the rock is from the so-called western deposits of Idaho, Wyoming, Utah and Montana.

Vanadium, however, is an undesirable component of wet process phosphoric acid in that it prevents the use of the phosphoric acid in making animal feed supplements, as the amount of vanadium must be kept at a low level in such animal feed supplements. Similarly, uranium is undesirable in such feed supplements.

On the other hand, vanadium and uranium are valuable materials and wet process phosphoric acid can be an important source of these materials. Therefore, a process for the simultaneous recovery of vanadium and uranium from wet process phosphoric acid provides an important benefit, in that the vanadium and uranium are converted from undesirable contaminants to valuable by-products.

BRIEF DESCRIPTION OF THE PRIOR ART

There have been many attempts made in the past to recover vanadium from wet process acid. One such process involves addition of a soluble ferrocyanide compound to the acid to precipitate the vanadium, as described more fully in U.S. Pat. No. 1,544,911. Other such processes involve extraction of the acid with an organic extractant for the vanadium. U.S. Pat. No. 2,211,119 describes a process in which the preferred organic extractant is isopropyl ether. U.S. Pat. No. 3,437,454 describes a process in which the preferred organic extractant is an alphahydroxy oxime. In U.S. Pat. No. 3,700,415, assigned to the same assignee as the present invention, there is described a process for extracting vanadium from wet process phosphoric acid utilizing certain neutral organophosphorus compounds as an extractant.

Further, there have been several processes developed for recovering uranium from wet process acids derived from eastern phosphate deposits. Typical of such uranium recovery processes are those disclosed in U.S. Pat. Nos. 2,859,094, 3,052,514 and 3,243,257 using, as an extractant, a mixture of a dialkyl phosphoric acid and a neutral organophosphorus compound.

Furthermore, in U.S. Pat. No. 3,836,476, assigned to the same assignee as the present invention, there is described a process for the simultaneous coextraction of uranium and vanadium from wet process phosphoric acid utilizing, as an extractant, a mixture of dialkyl phosphoric acid, trialkylphosphine oxide and an organic diluent. That process has resulted in the successful coextraction of up to approximately 82 percent of the vanadium and approximately 88 percent of the uranium present in the wet process acid.

SUMMARY OF THE INVENTION

It has now been discovered that an organic solvent comprising a mixture of (a) an alkyl substituted diaryl phosphoric acid, (b) a trialkylphosphine oxide compound and (c) an organic diluent will effectively coextract up to approximately 99 percent of the uranium and approximately 85 percent of the vanadium present in wet process acids while utilizing extractant concentrations lower than heretofore possible. This improved extraction capability results in a significantly lower volume of solvent required to effect uranium and vanadium recovery from wet process acids. Thus, the new extractant composition provides a more economical process in that (1) smaller processing equipment is required; (2) smaller solvent inventories are required and (3) lower extractant concentrations can be used to effect the recovery operations.

In addition, the process of the present invention has been found to remove certain other impurities from wet process phosphoric acid. These include yttrium, iron, zinc, bromine and possibly trace amounts of other metallic components. This purification is seen as a valuable side effect of the present process and provides the additional benefit of allowing the recovery of other by products of economic worth such as yttrium.

Broadly, the present invention provides a process for the simultaneous coextraction of uranium and vanadium for acidic solutions. In practicing the process, the aqueous acidic solution containing uranium and vanadium values first is treated with an oxidant to oxidize the uranium to the hexavalent oxidation state(VI) and the vanadium to the pentavalent oxidation state(V).

The oxidized aqueous acidic solution then is contacted with an organic solvent comprising a mixture of (a) an alkyl substituted diaryl phosphoric acid, (b) a trialkylphosphine oxide compound and (c) an organic diluent. The molar ratio of alkyl substituted diaryl phosphoric acid to trialkylphosphine oxide compound is within the range of from about 1:10 to about 1.5:1, with a preferred range of from about 1:8 to about 1:1 and an especially preferred range of from about 1:3 to about 4:5. It has been found that by utilizing such ratios, substantial quantities of uranium and vanadium are coextracted into the organic phase.

The loaded organic phase subsequently is separated from the aqueous phase. Thereafter, the uranium and vanadium are stripped from the loaded organic phase with, for example, solutions of an aqueous base or reducing agents.

According to a preferred embodiment, the vanadium is preferentially stripped from the loaded organic phase utilizing a base such as, for example, sodium hydroxide, and controlling the addition of the stripping solution so that the equilibrium pH is about 5.5. Subsequently, the uranium can be stripped from the organic phase by an aqueous basic solution such as sodium carbonate or ammonium carbonate, for example, or by a reducing agent such as ferrous iron dissolved in phosphoric acid.

DESCRIPTION OF THE PREFERRED EMBODIMENTS

In accordance with the present invention, a process is provided for the coextraction of uranium and vanadium from an aqueous acidic solution containing the same utilizing a solvent comprising a mixture of complexing agents (a trialkylphosphine oxide compound and an alkyl substituted diaryl phosphoric acid) and an organic diluent.

The trialkylphosphine oxide compounds of this invention have the following general formula:

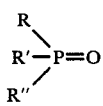

where R, R' and R" each are organic saturated hydrocarbon radicals containing from 4 to 14 carbons. Mixtures of compounds having the general formula as defined above also may be used.

Exemplary alkyl radicals of the above formula are the butyl, amyl, hexyl and octyl radicals.

In addition to the tertiary phosphine oxides, it is to be understood that within the scope of the claimed invention the corresponding oxonium salts are also contemplated. As examples of such oxonium salts may be mentioned tri-n-octylphosphinoxonium bisulfate, tri-n-octylphosphinoxonium phosphate and tri-n-butylphosphinoxonium nitrate. These salts are typically prepared by contacting an organic solution of a phosphine oxide with an aqueous solution of the appropriate acid.

According to a preferred embodiment of the present invention, the trialkylphosphine oxide compounds are those wherein R, R' and R" are alkyl radicals of from 6 to 12 carbon atoms.

An especially preferred trialkylphosphine oxide compound according to the present invention is tri-n-octylphosphine oxide.

The alkyl substituted diaryl phosphoric acids applicable to the instant invention are represented by the general formula:

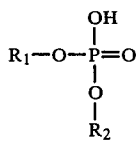

where $R_1$ and $R_2$ represent aryl radicals, at least one of which is substituted with an alkyl group, and the total number of carbon atoms contained in the alkyl substituted diaryl phosphoric acid is at least 13. Examples of applicable alkylaryl groups include 2-ethylhexylphenyl, n-octylphenyl, pentylphenyl, hexylphenyl, heptylphenyl, nonylphenyl, dodecylphenyl and the like.

A preferred group of alkyl substituted diaryl phosphoric acids are those containing from about 16 to 36 carbon atoms. Examples of such acids include butylphenyl-phenyl phosphoric acid, butylphenyl-octylphenyl phosphoric acid, didodecylphenyl phosphoric acid and dioctyphenyl phosphoric acid. An especially preferred acid is dioctylphenyl phosphoric acid.

In accordance with the present process, the trialkylphosphine oxide compound and the alkyl substituted diaryl phosphoric acid are dissolved in a water-immiscible organic solution containing the uranium and vanadium. The term "water-immiscible organic diluent" as used herein refers to an organic material normally liquid at ambient temperatures which may be substantially, but not necessarily entirely, insoluble in water. The preferred organic diluents for the process of the present invention are hydrocarbons. Examples of suitable hydrocarbon solvents include isooctane, kerosene, and the like. Solvents which contain functional groups can also be employed providing that the functional groups do not adversely affect the extraction. Particularly good results are obtainable when the organic diluent is a substantially nonreducing diluent with respect to oxidation by the vanadium(V) present.

The amount of organic extractant phase to be used for most efficient extraction is from about 0.15 to about 10 times the volume of acid solution to be treated. Particularly good results have been obtained with an organic to aqueous ratio of from about 0.5:1 to about 1.5:1. The ratio of organic phase to aqueous acid phase to be used is dependent upon the concentration of extractants in the organic phase, the temperature at which the extraction is performed, the contact time between the two phases and the amount of vanadium(V) in the acid solution. The concentration of trialkylphosphine oxide in the organic phase may range from about 0.05 molar to about its limit of solubility in the particular diluent employed, which limit is generally about 0.5 molar to about 1.0 molar. An especially preferred range of trialkylphosphine oxide concentration is from about 0.1 to about 0.5 molar. The amount of alkyl substituted diaryl phosphoric acid present in the organic phase may be determined based on the desired ratio of trialkylphosphine oxide compound to alkyl substituted diaryl phosphoric acid. The molar ratio of alkyl substituted diaryl phosphoric acid to trialkylphosphine oxide may vary from about 1:10 to about 1.5:1, the especially preferred range being from about 1:3 to about 4:5.

The process of the present invention is applicable to any aqueous acidic solution containing uranium and vanadium. The instant process is particularly applicable to wet process phosphoric acid obtained from the western phosphate deposits which contain significant quantities of both uranium and vanadium.

It has been found in the practice of this invention that fluoride must be present in the aqueous acidic solution in order for the complexing agents of the present invention to properly complex the vanadium(V). Although the exact theory of the complex is not known, it is believed that the fluoride is complexed with vanadium(V) and the complexing agent. The amount of fluoride present in the mixture preferably is at least about 0.25 moles per mole of vanadium present, although a large excess of fluoride does not harm the extraction. Fluoride is a natural component of wet process phosphoric acid and therefore wet process phosphoric acid is particularly suited to the extraction process of the present invention.

Prior to contacting the aqueous acidic solution with the organic extractant mixture, the aqueous solution is treated, if necessary, with an oxidizing agent to make certain that the vanadium contained therein is in the pentavalent oxidation state(V) and the uranium is in the hexavalent oxidation state(VI). When the vanadium and uranium are not present as vanadium(V) and uranium(VI), the extraction process with the solvent extractants of the present invention is not satisfactory as vanadium and uranium in the lower oxidation states do not form a complex with the extractants contemplated in the scope of the invention.

The aqueous acidic solution may be oxidized by any known method such as, for example, with sodium chlorate, manganese dioxide, ozone, and the like. The oxidizer should be added in an amount sufficient to provide at least the stoichiometric requirements for oxidation of all the vanadium to vanadium(V) and uranium to uranium(VI). When there are other oxidizable species present in the aqueous acidic solution, such as are found in wet process acid, for example, it is desirable to provide an excess of the stoichiometric requirements of the oxidizer. This being necessary, of course, to insure that substantially all the uranium and vanadium values present are oxidized.

The process of the present invention may be practiced within a temperature range of from about 20° C. to about 80° C. with a temperature of about 35° C. to about 55° C. being preferred.

It has been found that the contact time between the organic phase and the acid phase is an important variable to consider when extracting vanadium from acidic solutions. Longer contact times result in increased vanadium extraction. In practice, contact times of from about 1 minute to about 60 minutes are satisfactory with about 5 minutes to about 30 minutes per contact being especially preferred at temperatures of from about 40° C. to about 50° C. The extraction may be performed on a batch basis or a continuous basis, such as in a continuous countercurrent multi-stage extraction system.

In the process of the present invention, the organic phase is contacted with an aqueous acidic solution containing uranium and vanadium, at least a major portion of the vanadium and uranium values being in the pentavalent and hexavalent oxidation states respectively, whereby the uranium and vanadium are simultaneously coextracted in the organic phase. The loaded organic phase may be stripped by conventional methods; for example, the loaded organic phase may be contacted with an aqueous solution of sodium carbonate, ammonium carbonate or similar base at a pH above about 8.4 to simultaneously strip both the vanadium and uranium values contained therein.

According to a preferred embodiment of the invention, the vanadium can be stripped from the organic extract phase, free from the uranium. In this embodiment the loaded organic phase is contacted with an aqueous sodium hydroxide, sodium carbonate or other suitable basic stripping solution under carefully controlled conditions so that the equilibrium pH of the resulting mixture does not exceed about 6. However, the equilibrium pH may rise to about 8.4 without causing significant stripping of uranium. It has been discovered that by such control of the equilibrium pH that vanadium is preferentially stripped from the loaded organic phase. Particularly good results have been obtained when the addition of a stripping solution is controlled such that the equilibrium pH is from about 5.5 to about 6.0. Under such conditions, substantially all the vanadium is stripped from the loaded organic phase with negligible amounts of uranium being removed. Thus, stripping with an aqueous sodium hydroxide or similar solution at a controlled pH results in the preferential removal of only the vanadium values. The remaining uranium loaded organic can be processed for the subsequent removal of the uranium values. For example, the uranium loaded organic phase can be stripped with an aqueous solution of sodium carbonate, ammonium carbonate or similar base at a pH above about 8.4.

Suitable aqueous base strip solutions may contain any one of a number of alkali metal hydroxides, carbonates or mixtures thereof. Ammonium hydroxide can be used but is not as desirable for stripping vanadium as the alkali metal hydroxides or carbonates.

Alternatively, the uranium loaded organic phase can be stripped with an aqueous acidic solution of phosphoric acid or hydrofluoric acid. A preferred form of aqueous acidic stripping is obtained through addition of a reducing agent to the acidic solution which is capable of reducing uranium to the tetravalent state.

In alternate embodiments, both the vanadium and uranium can be stripped from the organic extract phase by means of a reducing agent. Selection of an appropriate reducing agent and process conditions provide a means by which the vanadium and uranium can be simultaneously stripped from the loaded organic phase into the same aqueous medium or sequentially into the same or different aqueous media.

In one alternate embodiment, vanadium and uranium are simultaneously stripped from the loaded organic phase with a phosphoric acid solution containing a reducing agent, such as ferrous iron, in such an amount so as to reduce the vanadium to a mixture of trivalent and tetravalent states while reducing the uranium to the tetravalent state.

In another alternate embodiment, the amount of reducing agent is controlled such that only vanadium is reduced and stripped from the loaded organic phase and the uranium remains primarily in the hexavalent state. To produce high concentrations of vanadium in the stripping solution by this technique, it is desirable to wash the stripped organic phase in a counter-current fashion with the stripping medium makeup solution prior to addition of the reducing agent to the solution.

In yet another alternate embodiment, vanadium can be selectively stripped from the loaded organic phase through use of a reducing agent in an aqueous stripping solution which is not capable of complexing tetravalent uranium. Such non-complexing aqueous stripping solutions include sulfuric acid and the like. When using ferrous iron as the reducing agent in the sulfuric acid stripping solution, the reduction and stripping of vanadium is essentially complete while virtually no uranium is stripped from the loaded organic phase. The uranium then can be stripped by any of the previously described methods.

An additional means of selectively stripping vanadium from the loaded organic phase is with strong nitric acid solutions, which may also contain additional nitrate salts. While it is not clearly understood, it is believed the selective stripping results from the high affinity of the alkylphosphine oxide component of the organic phase for nitric acid.

Stripping may be accomplished in a batch or continuous operation. A preferred method utilized a multi-stage countercurrent stripping process.

The foregoing description and the following specific examples are for the purpose of illustration and are not to be considered as limiting the scope of the invention, reference being had to the appended claims for this purpose.

EXAMPLE I

This example demonstrates, in a one stage extraction, the effect of varying the molarity of the trialkylphosphine oxide compound and alkyl substituted diaryl phosphoric acid in the organic phase as well as the effect of varying the ratio of trialkylphosphine oxide compound to alkyl substituted diaryl phosphoric acid.

In a single stage extraction, a separatory funnel mounted in a wrist shaker is utilized. The aqueous acidic solution is an oxidized wet process phosphoric acid (WPA) obtained from a western phosphate deposit and containing 1.53 grams per liter vanadium as $V_2O_5$ and 0.148 grams per liter uranium as $U_3O_8$. The organic extractant phase is a kerosene diluent containing various quantities of tri-n-octylphosphine oxide (TOPO) and dioctylphenyl phosphoric acid (DOPPA) as set forth in Table I below. The separatory funnel contains a portion of the organic extractant solution and is contacted with the oxidized wet process phosphoric acid. The organic to aqueous ratio is maintained at 1 and the extractions are conducted at 50° C. with a 20 minute mix time. After the extraction, the aqueous phase is analyzed to determine the percent vanadium and uranium remaining therein. The results are set forth in Table I below. Further, Table I also shows the percent of $V_2O_5$ and $U_3O_8$ extracted.

TABLE I
SIMULTANEOUS EXTRACTING OF VANADIUM AND URANIUM FROM OXIDIZED WPA BY VARIOUS MOLE RATIOS OF DOPPA AND TOPO

| Solvent Composition Molarity | | Analysis, g/l Aqueous Phase | | Percent Extracted | |
|---|---|---|---|---|---|
| TOPO | DOPPA | $V_2O_5$ | $U_3O_8$ | $V_2O_5$ | $U_3O_8$ |
| 0.2 | 0.1 | 0.71 | 0.058 | 46.4 | 60.8 |
| 0.2 | 0.15 | 1.07 | 0.048 | 30.1 | 67.6 |
| 0.2 | 0.2 | 1.42 | 0.045 | 7.2 | 69.6 |
| 0.2 | 0.3 | 1.42 | 0.036 | 7.2 | 75.7 |
| 0.3 | 0.15 | 0.59 | 0.039 | 61.4 | 73.6 |
| 0.25 | 0.125 | 0.62 | 0.052 | 59.5 | 64.9 |
| 0.20 | 0.0 | 0.31 | 0.142 | 79.7 | 4.1 |
| 0.0 | 0.2 | 1.44 | 0.136 | 5.9 | 8.1 |

From the results set forth in Table I, it will be seen that the optimum simultaneous coextraction of uranium and vanadium occurs when the molar ratio of alkyl substituted diaryl phosphoric acid to trialkylphosphine oxide is about 0.5. The exact concentration utilized depends on the concentration of vanadium in the solution to be processed and on the relative economic value of the two metals compared with the total costs of the recovery process.

EXAMPLE II

This example more fully demonstrates the simultaneous coextraction capability of this invention.

In a four-stage extraction process, four separatory funnels mounted in wrist shakers are utilized. The aqueous acidic solution is WPA obtained from a western phosphate deposit containing 1.53 grams per liter vanadium as $V_2O_5$ and 0.148 grams per liter uranium as $U_3O_8$. The organic extractant phase is a kerosene diluent containing 0.25 M tri-n-octylphosphine oxide (TOPO) and 0.125 M dioctylphenyl phosphoric acid (DOPPA). Each of the four separatory funnels contains a portion of the organic extractant solution and is contacted serially with the WPA. The organic to aqueous ratio is maintained at 1 and the extractions are conducted at 50° C. with a 20 minute mix time per stage. After each extraction stage, the aqueous phase is analyzed to determine the percent vanadium and uranium remaining therein. The results are set forth in Table II below.

TABLE II
SERIAL SIMULTANEOUS EXTRACTIONS OF VANADIUM AND URANIUM FROM OXIDIZED WPA BY 0.125M DOPPA AND 0.25M TOPO SOLVENT

| Extraction Stage # | Analysis, g/l Aqueous Phase | | Cumulative Percent Extracted | |
|---|---|---|---|---|
| | $V_2O_5$ | $U_3O_8$ | $V_2O_5$ | $U_3O_8$ |
| 1 | 0.57 | 0.050 | 62.7 | 66.2 |
| 2 | 0.38 | 0.015 | 75.2 | 89.9 |
| 3 | 0.28 | 0.005 | 81.7 | 96.6 |
| 4 | 0.26 | 0.001 | 83.0 | 99.3 |

EXAMPLE III

This example illustrates the preferential separation of vanadium from a vanadium-uranium loaded extractant organic phase.

A sample of organic extract phase loaded with vanadium and uranium is prepared containing 0.25 M tri-n-octylphosphine oxide (TOPO) and 0.125 M dioctylphenyl phosphoric acid (DOPPA) in kerosene loaded with 2.61 grams per liter $V_2O_5$ and 0.175 grams per liter $U_3O_8$.

The sample is scrubbed with water in a two-stage process. It has been found that an initial water scrub removes some of the impurities that are coextracted from WPA, such as phosphoric acid and hydrofluoric acid. The removal of such impurities reduces the amount of sodium carbonate or other base required to strip the uranium and vanadium from the loaded extractant. The sample of loaded organic is serially contacted with an equal amount of water placed in separatory funnels mounted on a wrist action shaker and agitated for 5 minutes at a temperature of 50° C. Following the water scrub, a sample of the aqueous phase of each stage is obtained and analyzed. The analyses are set forth in Table III below.

TABLE III
WATER SCRUBBING OF VANADIUM AND URANIUM LOADED 0.125 DOPPA and 0.25 TOPO SOLVENT

| Scrub Stage # | Analysis of Scrub Water, g/l | | Analysis of Scrubbed Organic Phase, g/l | |
|---|---|---|---|---|
| | $V_2O_5$ | $U_3O_6$ | $V_2O_5$ | $U_3O_8$ |
| 1 | 0.17 | <0.001 | — | — |
| 2 | 0.07 | <0.001 | 2.32 | 0.175 |

The results set forth in Table III clearly show that substantially no uranium and little vanadium is removed by water scrubbing.

The water scrubbed organic extract phase preferentially is stripped of its vanadium content utilizing the following procedure. In the first steps, the water scrubbed loaded organic extract phase is placed in a beaker equipped with a stirrer. A sufficient volume of an aqueous sodium carbonate strip solution is slowly added to the beaker to provide an equilibrium pH of about 6.0. The contents of the beaker then are stirred for 5 minutes at 50° C. following which the aqueous strip solution containing the vanadium is removed from the beaker. That solution and the remaining organic extract phase both are analyzed. The results are set forth in Table IV below. In the second stage of stripping, the remaining organic extract phase is contained with a further solution of sodium carbonate in an amount sufficient to provide an equilibrium pH of 8.4. The mixture is stirred for 5 minutes at 50° C. following which the aqueous strip solution containing residual vanadium is recovered. That solution and the then remaining organic phase are analyzed. The results are set forth in Table IV below.

TABLE IV

SELECTIVE STRIPPING OF VANADIUM FROM VANADIUM AND URANIUM LOADED 0.125M DOPPA AND 0.25M TOPO SOLVENT

| Stage No. | Analysis of Vanadium-Containing Strip Solution, g/l | | | Analysis of Stripped Organic Phase, g/l | |
|---|---|---|---|---|---|
| | $V_2O_5$ | $U_3O_8$ | pH | $V_2O_5$ | $U_3O_8$ |
| 0 | — | — | — | 2.32 | 0.175 |
| 1 | 2.14 | <0.001 | 6.0 | 0.17 | 0.182 |
| 2 | 0.06 | <0.001 | 8.4 | <0.05 | 0.184 |

The results as set forth in Table IV clearly demonstrate that the vanadium is recovered substantially free of uranium. Less than 0.001 grams per liter uranium are found with the vanadium. The uranium subsequently is recovered from the vanadium stripped extractant by contacting it with a sufficient amount of an aqueous base solution to maintain the equilibrium pH above about 8.4.

Alternatively, both the uranium and vanadium may be stripped by a reducing agent in acid solution, or the uranium alone may be stripped by a reducing agent in acid solution or by high concentration of phosphoric or hydrofluric acid. For example, the vanadium stripped organic extract phase is stripped of its uranium utilizing the following procedure. The uranium loaded organic is contacted with an equal amount of alternate stripping agent aqueous solution placed in separatory funnels mounted on a wrist-action shaker and agitated for 5 minutes at a temperature of 50° C. The organic and aqueous phases are separated and the organic phase is analyzed. The results of these tests are set forth in Table V below.

TABLE V

SINGLE STAGE STRIPPING OF URANIUM FROM VANADIUM STRIPPED-URANIUM LOADED 0.125M DOPPA AND 0.25M TOPO SOLVENT

| Stripping Agent (In $H_2O$) | Analysis of Stripped Organic Phase, g/l $U_3O_8$ |
|---|---|
| NONE | 0.184 |
| 85% $H_3PO_4$ | 0.009 |
| 12M $H_3PO_4$* | 0.028 |
| 20% HF | 0.040 |

*Containing 2 g/l iron (II)

EXAMPLE IV

This example illustrates the preferential separation of vanadium from a vanadium-uranium loaded extractant organic phase using an aqueous acidic stripping solution containing a reducing agent.

A sample of organic extract phase loaded with vanadium and uranium is prepared and scrubbed with water as illustrated in Example III. The water scrubbed organic extract phase contains 0.25 M tri-n-octylphosphine oxide (TOPO) and 0.125 M dioctylphenyl phosphoric acid (DOPPA) in kerosene loaded with 1.0 grams per liter $V_2O_5$ and 0.081 grams per liter $U_3O_8$.

The water scrubbed organic extract phase preferentially is stripped of its vanadium content utilizing the following procedure. The sample is contacted with an equal volume of a sulfuric acid solution containing ferrous iron placed in a separatory funnel mounted on a wrist-action shaker and agitated for 5 minutes at a temperature of 50° C. Following the agitation, the organic and aqueous phases are separated and the aqueous phase is analysed. The results of this test are set forth in Table VI below.

TABLE VI

SELECTIVE STRIPPING OF VANADIUM FROM VANADIUM AND URANIUM LOADED 0.125M DOPPA - 0.25M TOPO SOLVENT

| Stripping Agent | Analysis of Vanadium and Uranium Loaded Organic Phase, g/l | | Analysis of Resultant Strip Solution, g/l | |
|---|---|---|---|---|
| | $V_2O_5$ | $U_3O_8$ | $V_2O_5$ | $U_3O_8$ |
| 5 vol. % $H_2SO_4$* | 1.0 | 0.081 | 0.76 | 0.0019 |

*containing 9 g/l iron II

The results as set forth in Table VII clearly demonstrate that the vanadium is recovered substantially free of uranium. Less than 0.002 grams per liter uranium are found with the vanadium.

EXAMPLE V

This example illustrates the preferential separation of vanadium from a vanadium-uranium loaded extractant organic phase using aqueous nitric acid solutions.

A sample of organic extract phase loaded with vanadium and uranium is prepared and scrubbed with water as illustrated in Example III. The water scrubbed organic extract phase contains 0.25 M tri-n-octylphosphine oxide (TOPO) and 0.125 M dioctylphenyl phosphoric acid (DOPPA) in kerosene loaded with 1.0 grams per liter $V_2O_5$ and 0.081 grams per liter $U_3O_8$.

The water scrubbed organic extract phase preferentially is stripped of its vanadium content utilizing the following procedure. Samples are contacted with an equal volume of a nitric acid solution placed in separatory funnels mounted on a wrist-action shaker and agitated for 5 minutes at a temperature of 50° C. Following the agitation, the organic and aqueous phases are separated and the aqueous phase is analyzed. The results of these tests are set forth in Table VII below.

TABLE VII

SELECTIVE STRIPPING OF VANADIUM FROM VANADIUM AND URANIUM LOADED 0.125M DOPPA - 0.25M TOPO SOLVENT

| Stripping Agent | Analysis of Vanadium and Uranium Loaded Organic Phase, g/l | | Analysis of Resultant Strip Solution, g/l | |
|---|---|---|---|---|
| | $V_2O_5$ | $U_3O_8$ | $V_2O_5$ | $U_3O_8$ |
| 0.5M $HNO_3$ | 1.0 | 0.081 | 0.24 | <0.0005 |
| 0.5M $HNO_3$ + 3M $NH_4NO_3$ | 1.0 | 0.081 | 0.37 | <0.0005 |
| 1.0M $HNO_3$ | 1.0 | 0.081 | 0.40 | <0.0005 |

The results set forth in Table VII clearly demonstrate that the vanadium is recovered substantially free of uranium. Further, the data show that nitric acid solutions supplemented with additional nitrate salts and stronger nitric acid solutions improve vanadium stripping.

EXAMPLE VI

This example illustrates simultaneous aqueous acidic solution stripping of vanadium and uranium from a vanadium-uranium loaded extractant organic phase.

A sample of organic extract phase loaded with vanadium and uranium is prepared and scrubbed with water as illustrated in Example III. The water scrubbed organic extract phase contains 0.25 M tri-n-octylphosphine oxide (TOPO) and 0.25 M dioctylphenyl phosphoric acid (DOPPA) in kerosene loaded with 1.0 grams per liter $V_2O_5$ and 0.081 grams per liter $U_3O_8$.

The water scrubbed organic extract phase simultaneously is stripped of its vanadium and uranium by utilizing the following procedure. Samples are contacted with equal volumes of aqueous acidic solutions placed in separatory funnels mounted on a wrist-action shaker and agitated for 5 minutes at a temperature of 50° C. Following the agitation, the organic and aqueous phases are separated and the aqueous phase is analyzed. The results of these tests are set forth in Table VII below.

TABLE VIII

SIMULTANEOUS VANADIUM
AND URANIUM STRIPPING
FROM VANADIUM AND URANIUM LOADED
0.125M DOPPA - 0.25M TOPO SOLVENT

| Stripping Agent | Analysis of Vanadium and Uranium Loaded Organic Phase, g/l | | Analysis of Resultant Strip Solution, g/l | |
|---|---|---|---|---|
| | $V_2O_5$ | $U_3O_8$ | $V_2O_5$ | $U_3O_8$ |
| 50% $H_3PO_4$ | 1.0 | 0.081 | 0.49 | 0.091* |
| 70% $H_3PO_4$ | 1.0 | 0.081 | 0.49 | 0.078 |
| 85% $H_3PO_4$ | 1.0 | 0.081 | 0.49 | 0.062 |
| 24% HF | 1.0 | 0.081 | 0.94 | 0.087* |

*value is within the experimental accuracy of the fluorometric analysis employed The results as set forth in Table VIII clearly demonstrate the ability to simultaneously recover substantial amounts of vanadium and uranium from a loaded organic extract phase.

EXAMPLE VII

This example illustrates simultaneous aqueous acidic solution stripping of vanadium and uranium from a vanadium-uranium loaded extractant organic phase.

A sample of organic extract phase loaded with vanadium and uranium is prepared containing 0.25 M tri-n-octylphosphine oxide (TOPO) and 0.125 M dioctylphenyl phosphoric acid (DOPPA) in kerosene loaded with 3.60 grams per liter $V_2O_5$ and 0.073 grams per liter $U_3O_8$.

The loaded organic phase is stripped by contacting with an equal volume of an aqueous acidic solution placed in a separatory funnel mounted on a wrist-action shaker and agitated for 5 minutes at a temperature of 50° C. Following the agitation, the organic and aqueous phases are separated and the aqueous phase is analyzed. The results of these tests are set forth in Table IX below.

TABLE IX

SIMULTANEOUS VANADIUM
AND URANIUM STRIPPING
FROM VANADIUM AND URANIUM LOADED
0.125M DOPPA - 0.25M TOPO SOLVENT

| Stripping Agent | Analysis of Vanadium and Uranium Loaded Organic Phase, g/l | | Analysis of Resultant Strip Solution, g/l | |
|---|---|---|---|---|
| | $V_2O_5$ | $U_3O_8$ | $V_2O_5$ | $U_3O_8$ |
| 85% $H_3PO_4$ | 3.60 | 0.073 | 0.82 | 0.076* |
| 24% HF | 3.60 | 0.073 | 3.51 | 0.066 |

*value is within the experimental accuracy of the fluorometric analysis employed The results set forth in Table IX demonstrate an ability to simultaneously strip vanadium and uranium from the loaded organic phase.

EXAMPLE VIII

This example illustrates the simultaneous aqueous acidic solution stripping of vanadium and uranium from a vanadium-uranium loaded extractant organic phase.

A sample of organic extractant phase loaded with vanadium and uranium is prepared and scrubbed with water as illustrated in Example III. The water scrubbed organic extract phase contains 0.25 M tri-n-octylphosphine oxide (TOPO) and 0.125 M dioctylphenyl phosphoric acid (DOPPA) in kerosene loaded with 0.49 grams per liter $V_2O_5$ and 0.090 grams per liter $U_3O_8$.

The water scrubbed organic extract phase simultaneously is stripped of its vanadium and uranium by utilizing the following procedure. Samples are contacted with equal volumes of aqueous acidic solutions containing a reducing agent placed in separatory funnels mounted on a wrist-action shaker and agitated for 5 minutes at a temperature of 50° C. Following the agitation, the organic and aqueous phases are separated and the aqueous phase is analyzed. The results of these tests are set forth in Table X, below.

TABLE X

SIMULTANEOUS VANADIUM
AND URANIUM STRIPPING
FROM VANADIUM AND URANIUM LOADED
0.125M DOPPA - 0.25M TOPO SOLVENT

| Stripping Agent* | Analysis of Vanadium Uranium Containing Organic Phase, g/l | | Analysis of Resultant Strip Solution, g/l | |
|---|---|---|---|---|
| | $V_2O_5$ | $U_3O_8$ | $V_2O_5$ | $U_3O_8$ |
| 50% $H_3PO_4$ | 0.49 | 0.090 | 0.49 | 0.064 |
| 70% $H_3PO_4$ | 0.49 | 0.090 | 0.54** | 0.093** |
| 85% $H_3PO_4$ | 0.49 | 0.090 | 0.54** | 0.094** |

*containing 2 g/l iron II
**value is within the experimental accuracy of the fluorometric analysis employed The results set forth in Table X demonstrate the ability to simultaneously strip substantial amounts of vanadium and uranium from the loaded organic phase.

EXAMPLE IX

This example illustrates individual preferential stripping and separation of vanadium and uranium from a vanadium-uranium loaded extractant organic phase.

An organic phase containing 0.4 M tri-n-octylphosphine oxide (TOPO) and 0.2 M dioctylphenyl phosphoric acid (DOPPA) in kerosene continuously is loaded with vanadium and uranium in a small multistaged extraction module. The loaded organic extract phase then enters a multistage stripping module. Vanadium stripping and separation is accomplished in the first stage of the stripping module using a controlled volume of phosphoric acid solution that contains sufficient reducing agent to provide the stoichiometric quantity required to reduce the vanadium (V) content of the organic phase to the quadravalent state. This permits the preferential separation of vanadium and allows only a small quantity of the uranium to be stripped. The aqueous phase resulting from the stripping is quite rich in vanadium. The vanadium stripped organic phase then proceeds into a two stage phosphoric acid scrubber. The scrubbing is utilized to limit the advancement of vanadium containing solution into the downstream uranium stripping section. Iron is dissolved in the resultant vanadium scrub aqueous phase to provide the aqueous stripping solution employed in the first stage vanadium stripping section. In this manner, any vanadium scrubbed from the organic phase is returned to the vanadium stripping section to facilitate recovery.

The vanadium stripped and scrubbed organic phase then proceeds into the uranium stripping section comprising the fourth stage in the stripping module. In the fourth stage, the vanadium stripped and scrubbed organic phase contacts a controlled volume of phosphoric acid which contains a reducing agent in sufficient quantity to reduce any residual vanadium (V) and the uranium (VI) content to the lower vanadium (IV) and uranium (IV) states. It has been shown in the practice of this invention that the presence of the reducing agent in quantities in excess of the stoichiometric requirement is beneficial to uranium stripping. The uranium and vanadium stripped organic phase then enters a two stage phosphoric acid scrubber. The scrubbing is utilized to prevent the advancement of high grade uranium strip solution to the organic phase recycle storage tank. The scrubber aqueous phase was separated and split into two portions. Iron was dissolved in one portion of the resultant aqueous phase to provide the aqueous stripping solution employed in the fourth stage uranium stripping section. The remaining portion of the scrubber aqueous was recycled as aqueous feed to the two-stage vanadium scrubbers. In this manner, any vanadium or uranium that was scrubbed from the organic phase was caused to finally separate with the vanadium or uranium stripping products.

The preferential vanadium and uranium stripping of the loaded organic phase described hereinabove, produced a vanadium strip product solution containing in excess of 97 percent of the recoverable vanadium and a uranium strip product solution containing more than 93 percent of the recoverable uranium.

In the particular test described above, a 70 percent phosphoric acid solution was employed in all of the stages in the stripping module. Satisfactory phosphoric acid concentrations for this process are from about 20 percent to about 95 percent $H_3PO_4$. However, the phase ratios and number of stages required to effect stripping may change with varying concentrations. In addition, different acid concentrations may be used in different stages of the stripping module.

While this particular test employs iron as the reducing agent in the aqueous acidic solution, any reducing agent which is compatible with phosphoric acid and that is capable of reducing vanadium (V) and uranium (VI) to lower valence states can be used in this process.

While the present invention has been described with respect to preferred embodiments thereof, it will be understood, of course, that certain changes may be made therein without departing from its true scope as defined in the appended claims.

What is claimed is:

1. A process for the simultaneous recovery of uranium (VI) and vanadium (V) from an aqueous acidic solution containing the same which comprises: contacting said solution in the presence of at least about 0.25 mole fluoride per mole vanadium with an organic extractant phase comprising
(a) a substantially water-immiscible organic diluent;
(b) an alkyl substituted diaryl phosphoric acid having the formula

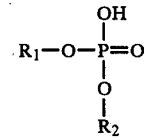

where $R_1$ and $R_2$ represent aryl radicals at least one of which is substituted with an alkyl group and the total number of carbon atoms in the alkyl substituted diaryl phosphoric acid is at least 13 and
(c) a trialkylphosphine oxide having the formula

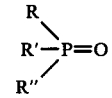

where R, R' and R" are alkyl radicals containing from 4 to 14 carbon atoms, whereby the uranium and vanadium are preferentially coextracted into the organic phase and, recovering the uranium and vanadium containing organic phase; the alkyl substituted diaryl phosphoric acid and trialkylphosphine oxide being present in the organic extractant phase in an amount sufficient to provide a molar ratio of alkyl substituted diaryl phosphoric acid to trialkyphosphine oxide of from 1:8 to 1:1.

2. The process of claim 1 wherein the ratio of alkyl substituted diaryl phosphoric acid to trialkyphosphine oxide is in the range of from 1:3 to 4:5.

3. The process of claim 1 wherein the concentration of trialkylphosphine oxide in the organic phase is in the range of from 0.05 molar to 1.0 molar.

4. The process of claim 1 wherein the trialkylphosphine oxide is tri-n-octylphosphine oxide.

5. The process of claim 1 wherein the alkyl substituted diaryl phosphoric acid is dioctylphenyl phosphoric acid.

6. The process of claim 1 wherein the ratio of alkyl substituted diaryl phosphoric acid to trialkylphosphine oxide is about 0.5.

7. The process of claim 1 wherein the alkyl substituted diaryl phosphoric acid is dioctylphenyl phosphoric acid and the trialkylphosphine oxide is tri-n-octylphosphine oxide.

8. The process of claim 1 wherein the aqueous acidic solution is a wet process phosphoric acid.

9. The process of claim 1 wherein the uranium and vanadium are stripped from the recovered organic phase with an aqueous base solution.

10. The process of claim 1 wherein the recovered organic phase is contacted with the aqueous basic solution in an amount sufficient to maintain the equilibrium pH at from about 5.5 to 8.4, whereby the vanadium preferentially is stripped from the organic phase to leave a vanadium-barren uranium containing organic phase.

11. The process of claim 10 wherein the uranium-containing organic phase is contacted with an aqueous basic carbonate solution in an amount sufficient to maintain the equilibrium pH above about 8.4 whereby the uranium is stripped from the organic phase and recovering the uranium substantially free of vanadium.

12. The process of claim 10 wherein the uranium-containing organic phase is contacted with at least one acid selected from the group consisting of phosphoric acid and hydrofluoric acid in a concentration sufficient to remove substantially all of the uranium from the organic phase.

13. The process of claim 10 wherein the uranium-containing organic phase is contacted with a solution containing (i) a reducing agent and (ii) at least one acid selected from the group consisting of phosphoric acid and hydrofluoric acid to remove substantially all of the uranium from the organic phase.

14. The process of claim 1 wherein the trialkylphosphine oxide is tri-n-octylphosphine oxide present in an amount sufficient to provide a concentration in the organic phase of from about 0.1 to about 0.5 molar and the alkyl substituted diaryl phosphoric acid is dioctylphenyl phosphoric acid.

15. The process of claim 1 wherein the trialkylphosphine oxide is tri-n-octylphosphine oxide present in an amount sufficient to provide a concentration of from about 0.25 molar to about 0.45 molar and the alkyl substituted diaryl phosphoric acid is dioctylphenyl phosphoric acid present in an amount sufficient to provide a concentration of from about 0.125 molar to about 0.23 molar.

16. The process of claim 1 wherein the vanadium containing organic phase is contacted with at least one solution selected from the group consisting of nitric acid and nitric acid containing additional nitrate salts to remove a substantial quantity of the vanadium from the organic phase.

17. The process of claim 1 wherein the vanadium containing organic phase is contacted with an aqueous solution containing (i) a reducing agent and (ii) sulfuric acid.

18. The process of claim 17 wherein the solution contains sulfuric acid in a range of from about 5 percent to about 35 percent by weight.

19. The process of claim 17 wherein the reducing agent is ferrous iron.

20. The process of claim 1 wherein the vanadium containing organic phase is contacted with an aqueous acidic solution containing a reducing agent.

21. The process of claim 20 wherein the reducing agent is ferrous iron.

22. The process of claim 1 wherein vanadium and uranium are simultaneously stripped from the recovered organic phase by contacting with at least one acid selected from the group consisting of phosphoric acid and hydrofluoric acid in a concentration sufficient to remove substantially all of the vanadium and uranium from the organic phase.

23. The process of claim 1 wherein the recovered organic phase is contacted with a solution containing (i) a reducing agent and (ii) at least one acid selected from the group consisting of phosphoric acid and hydrofluoric acid to remove substantially all of the vanadium from the organic phase.

24. The process of claim 23 wherein the reducing agent is ferrous iron.

25. The process of claim 23 wherein the reducing agent is trivalent vanadium.

26. The process of claim 23 wherein the organic phase is contacted with the solution in at least two stages to preferentially remove vanadium from the organic phase and then remove the uranium be contacting the organic phase with additional quantities of the solution.

27. The process of claim 1 wherein the aqueous acidic solution is wet process phosphoric acid containing at least one member selected from the group consisting of yttrium, iron, zinc and bromine.

28. The process of claim 27 wherein the organic phase also extracts the member selected from the group consisting of yttrium, iron, zinc and bromine.

29. The process of claim 28 wherein the member selected from the group consisting of yttrium, iron, zinc and bromine is stripped from the recovered organic phase with an aqueous acidic solution.

30. The process of claim 1 wherein the recovered organic phase is contacted with a solution containing (i) a reducing agent and (ii) at least one acid selected from the group consisting of phosphoric acid and hydrofluoric acid to remove substantially all of the uranium from the organic phase.

* * * * *